United States Patent
Richter et al.

(10) Patent No.: US 9,586,551 B2
(45) Date of Patent: Mar. 7, 2017

(54) ADJUSTABLE PARTITION

(71) Applicant: Adrian Steel Company, Adrian, MI (US)

(72) Inventors: Thomas S. Richter, Sand Creek, MI (US); Thomas M. Willis, Petersburg, MI (US)

(73) Assignee: Adrian Steel Company, Adrian, MI (US)

( * ) Notice: Subject to any disclaimer, the term of this patent is extended or adjusted under 35 U.S.C. 154(b) by 0 days.

(21) Appl. No.: 14/285,020

(22) Filed: May 22, 2014

(65) Prior Publication Data

US 2014/0346801 A1 Nov. 27, 2014

Related U.S. Application Data

(60) Provisional application No. 61/826,729, filed on May 23, 2013.

(51) Int. Cl.
*B60P 7/14* (2006.01)
*B60R 21/02* (2006.01)

(52) U.S. Cl.
CPC .................... *B60R 21/026* (2013.01)

(58) Field of Classification Search
CPC ......... B60R 21/026; B60R 9/052; B60P 7/14; B60P 3/00
USPC ....... 296/24.4, 24.43, 186.4, 26.09; 280/748, 280/749
See application file for complete search history.

(56) References Cited

U.S. PATENT DOCUMENTS

| | | | |
|---|---|---|---|
| 2,884,279 A * | 4/1959 | Halstead et al. | 296/24.42 |
| 3,441,309 A * | 4/1969 | Halstead et al. | 296/24.46 |
| 4,621,856 A * | 11/1986 | McKenzie | 296/24.4 |
| 6,059,313 A * | 5/2000 | Coogan et al. | 280/749 |
| 6,547,298 B2 * | 4/2003 | Sotiroff | B60J 5/047 280/748 |
| 6,971,828 B2 * | 12/2005 | Bernardo | 410/135 |
| 7,083,219 B1 * | 8/2006 | Gregory | B60P 3/14 296/100.12 |
| 8,177,275 B2 | 5/2012 | Willis et al. | |
| 2003/0141731 A1 * | 7/2003 | Betts et al. | 296/24.1 |
| 2006/0108815 A1 * | 5/2006 | Giumelli | B60R 21/026 296/24.4 |
| 2008/0253857 A1 * | 10/2008 | McJunkin | 410/132 |
| 2009/0127880 A1 * | 5/2009 | Willis et al. | 296/24.43 |

* cited by examiner

*Primary Examiner* — Jason S Morrow
*Assistant Examiner* — E Turner Hicks
(74) *Attorney, Agent, or Firm* — Marshall & Melhorn, LLC

(57) ABSTRACT

A positionable vehicle partition system includes at least two rails, a substantially planar partition for separating a vehicle area into at least two sections, a slide assembly to facilitate movement of the partition relative to the rails, and a latch for retaining the partition in a selected position relative to the rails. The rails are configured to be mountable in a spaced apart parallel relationship. The slide assembly includes at least a stationary slide member affixed to or defined by each of the rails, and at least one movable slide member extending away from and directly or indirectly affixed to the partition.

5 Claims, 6 Drawing Sheets

ADJUSTABLE PARTITION

CROSS-REFERENCE TO RELATED APPLICATION

This application claims the priority to U.S. Provisional Patent Application No. 61/826,729 filed May 23, 2013, which is hereby incorporated by reference in its entirety.

TECHNICAL FIELD

This disclosure relates to partitions for vehicles.

BACKGROUND

Numerous separate devices dividing the driver's compartment (cabin) and the cargo area of vans and other vehicles have been utilized in the past. The purpose of these devices were to confine cargo in the proper area in case of accident, promote security, and in some cases to help maintain temperature control in the driver's compartment.

These devices have been manufactured or designed with metal, aluminum, and fiberglass, either screwed or bolted to Plexiglass to provide rear view vision. These partitions in many cases required, at best, awkward manufacturing techniques, and did not necessarily achieve what they were designed for.

A notable example of a partition that separates the cab area from the cargo area of the work vehicle, and which is designed and configured to be installed into heritage high roof ("HHR") style vans without the requirement of drilling for installation is described in commonly owned U.S. Pat. No. 8,177,275, which is hereby incorporated by reference herein.

SUMMARY

In accordance with certain aspects of this disclosure, there is provided a positionable vehicle partition system having at least two rails configured to be mountable to a floor of a vehicle in a spaced apart paralleled relationship, a substantially planar partition for separating a vehicle space or area into at least two sections, a slide assembly having a stationary slide member affixed to or defined by each of the rails, and a movable slide member extending away from the partition, wherein the movable slide member is linearly slidable with respect to the stationary slide member. The system may also include a latch for retaining the partition in a selected position relative to the rails.

In accordance with certain aspects, the partition comprises a panel and a structurally reinforcing frame that extends at least partially along a perimeter of the panel.

In accordance with certain other aspects, the frame can be attached directly to structure integral with the rails.

In certain embodiments, the movable slide member is movable in the direction that is substantially parallel to a length direction of the rails.

In certain embodiments, the panel is comprised of intersecting wires that define an open mesh.

In certain aspects, the slide assembly includes an outer slide member, an intermediate slide member that is slidably movable with respect to the outer slide member, and an inner slide member that is slidably movable with respect to the intermediate slide member.

In certain aspects, the slide assembly includes friction reducing bearings to facilitate sliding movement of each slide member with respect to an adjacent slide member.

DETAILED DESCRIPTION

Figure 1:
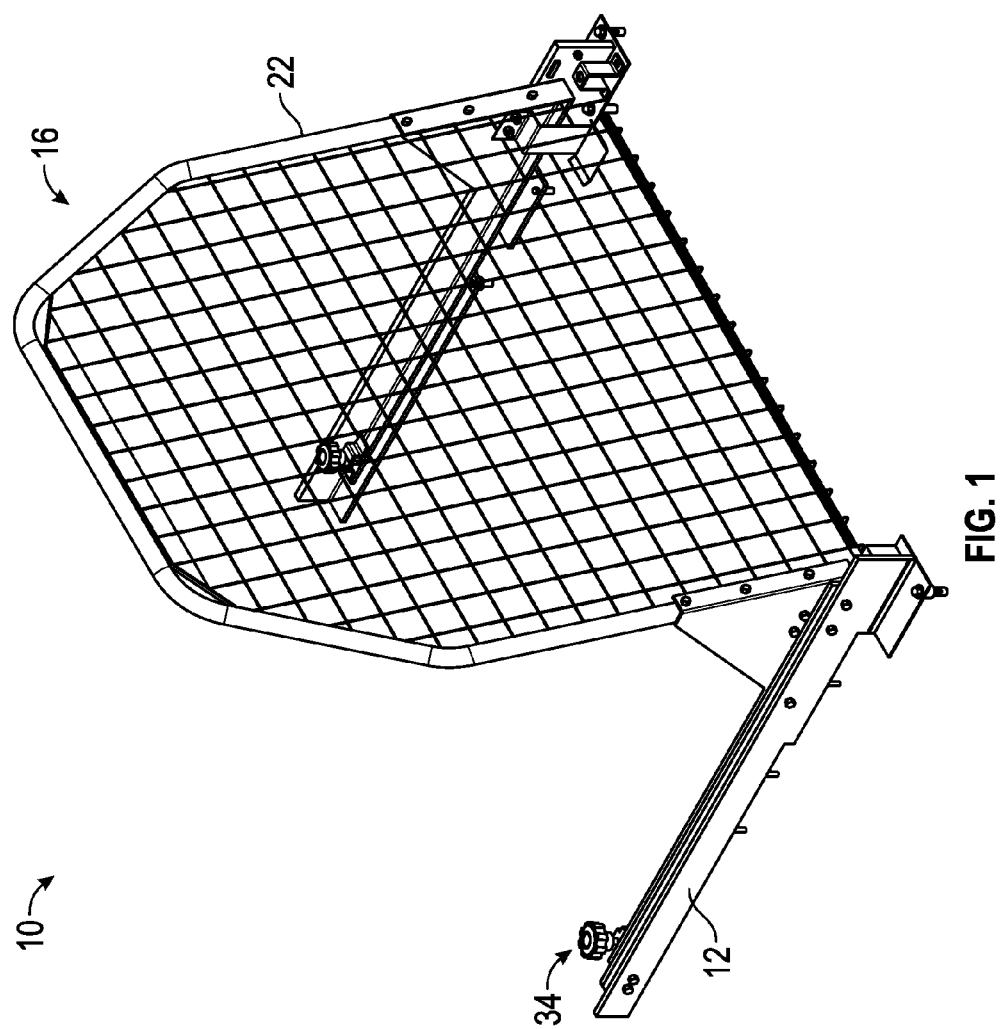
FIG. 1 is a perspective view of a positionable vehicle partition system with the partition in a fully retracted position.
Figure 3:
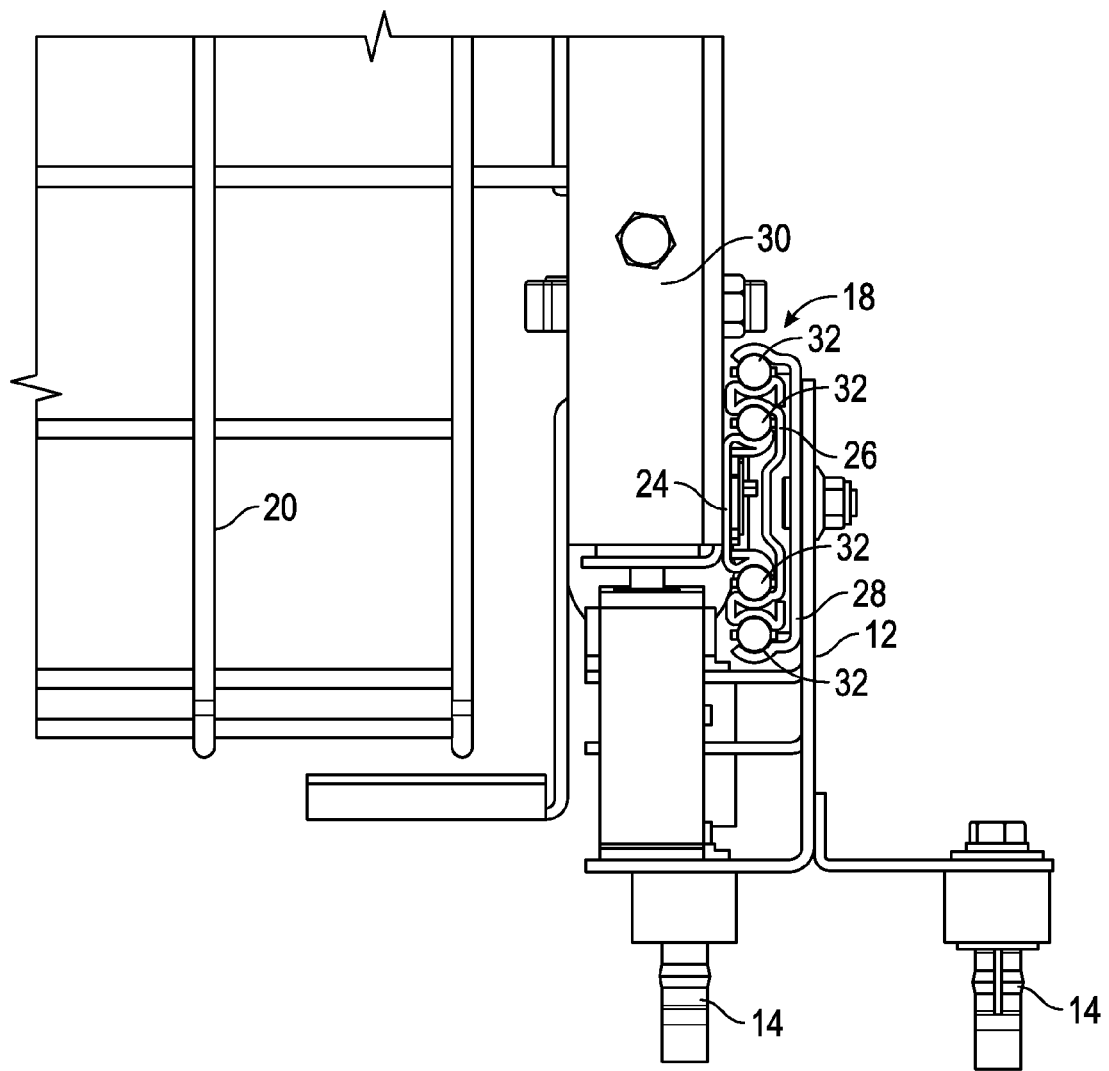
FIG. 3 is an enlarged, partial front end view of the partition system shown in FIG. 1, illustrating details of the slide assembly which facilitates sliding movement of the partition relative to the rails.

In FIG. 1, there is shown a positionable vehicle partition system 10 having rails 12 that are configured to be mounted to a floor or bed of a vehicle in a spaced apart parallel relationship, such as with fasteners 14, and a substantially planar partition 16 for separating a vehicle space or area into at least two sections, such as separating a vehicle bed (e.g., a pickup truck bed or the like) into at least two sections, or separating a cabin area of a vehicle from a cargo area in the interior of the vehicle. A slide assembly 18 (FIG. 3) allows partition 16 to be slidably moved with respect to rails 12. The term "positionable" is meant to encompass vehicle partition systems having a partition panel that can be easily secured in either or any of two or more different positions by manipulation of a latching mechanism, and that allows frequent and repeated repositioning between or among any of the two or more positions without significant wear or damage to the components thereof, and without requiring tools. The term "latching mechanism" or "latch" is meant to encompass any of various mechanical means releasably retaining the partition in a selected position relative to the rails which are stationarily affixed to a floor or bed of a vehicle.

Figure 2:
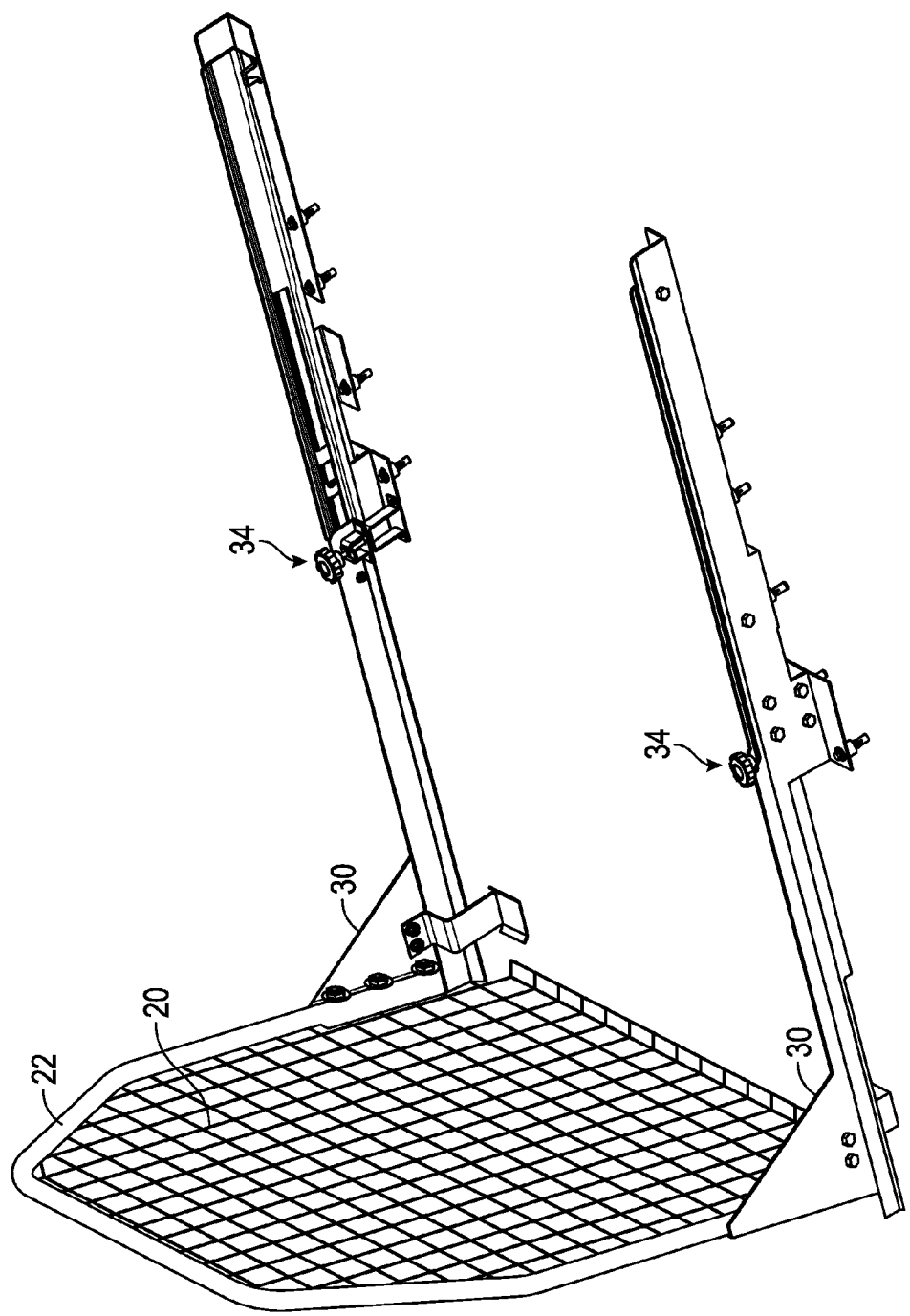
FIG. 2 is a perspective view of the partition system shown in FIG. 1, with the partition in a fully extended position.

FIG. 1 shows the partition system 10 with partition 16 in a fully retracted position relative to rails 12, and FIG. 2 shows system 10 with partition 16 in a fully extended position relative to rails 12.

Rails 12 can be mounted to the floor or bed of a vehicle using any of a variety of fasteners or fastening means, including mechanical fasteners, such as nuts and bolts (as illustrated), screws, rivets and the like, adhesives, or welds. While two spaced apart rails 12 are expected to be adequate, economical, and practical for most applications, it is possible to employ more than two rails.

Partition 16 includes a panel 20 and a structurally reinforcing frame 22 that extends partially along a perimeter of panel 20. In the illustrated embodiment, frame 22 is comprised of a plurality of tubular sections having a circular cross-section. However, frame 22, when employed, can have other forms and can be comprised of other components, such as L-shaped members, rods, square cross-sectioned tubular members, etc.

In the illustrated embodiment, panel 20 has a wire screen structure in which rods (e.g., metal such as stainless steel) or wires are arranged to define a mesh pattern having substantially equally sized square openings arranged in rows and columns. However, panel 20 can be replaced with a solid panel (i.e., a non-apertured panel), or a perforated sheet panel (e.g., a perforated metal sheet), or generally any other panel that is capable of preventing packages or other cargo from shifting or sliding along the floor or bed of a vehicle during acceleration or deceleration of the vehicle.

Illustrated slide assembly 18 (FIG. 3) includes an inner slide member 24, an intermediate slide member 26 that is slidably movable with respect to the inner slide member 24, and an outer slide member 28 that is slidably movable with respect to intermediate slide member 26. However, two slide members may be adequate for certain applications, and more than three slide members may be used if desired, such as to provide greater linear displacement of panel 20 with respect to rails 12. The slide members are configured to define tracks that facilitate sliding movement of one slide member with respect to an adjacent slide member.

In the illustrated embodiment, slide member 24 is affixed to a bracket 30 attached to frame 22 of partition 16. However, other arrangements are possible. For example, inner slide member 24 can be an integral feature of bracket 30, or can be indirectly attached to panel 20 through a different or additional intermediate components. In the illustrated embodiment, outer slide member 28 is attached to rail 12. However, other arrangements are possible. For example, outer slide member 24 can be an integral feature of rail 12 or can be indirectly attached to rail 12 through a different or additional components.

In order to reduce friction and make it easier for each of the slide members to slidably move relative to another slide member, movable bearings, such as ball bearings 32 can be provided.

Various suitable slide assemblies having two, three or more telescoping slide members, both with and without friction reducing bearings, are known and commercially available, and are commonly employed such as on sliding drawers intended to bear relatively heavy loads.

Figure 4:
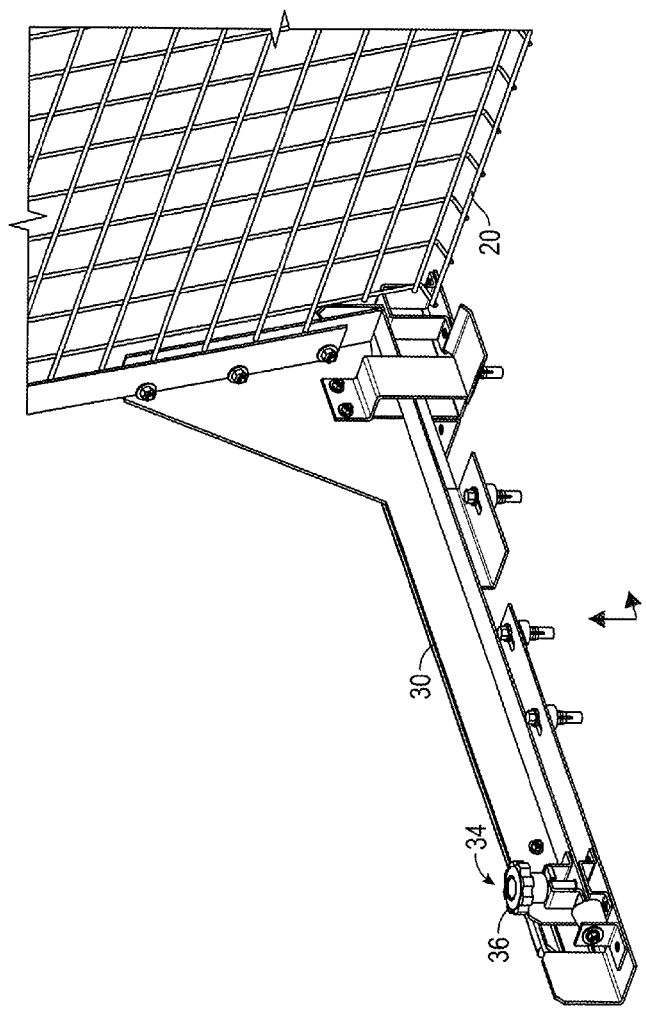
FIG. 4 is a rear perspective view of the partition system shown in FIG. 1, illustrating certain details.
Figure 5:
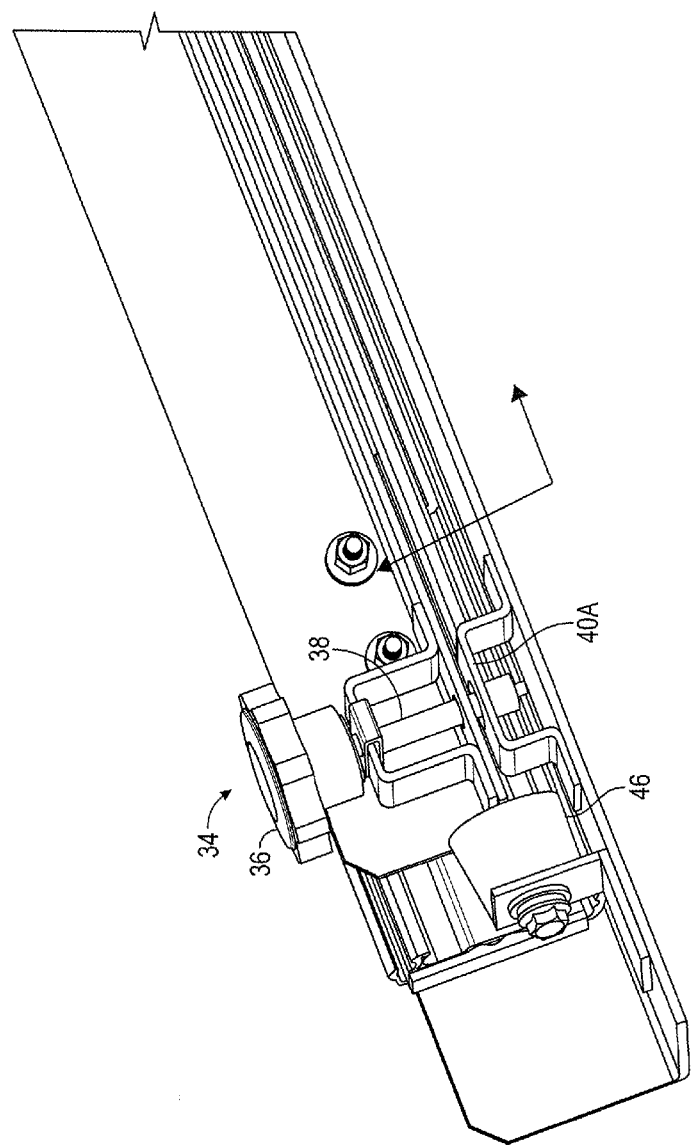
FIG. 5 is an enlarged perspective view showing details of a latch mechanism engaging a catch to retain the partition in a fully retracted position.
Figure 6:
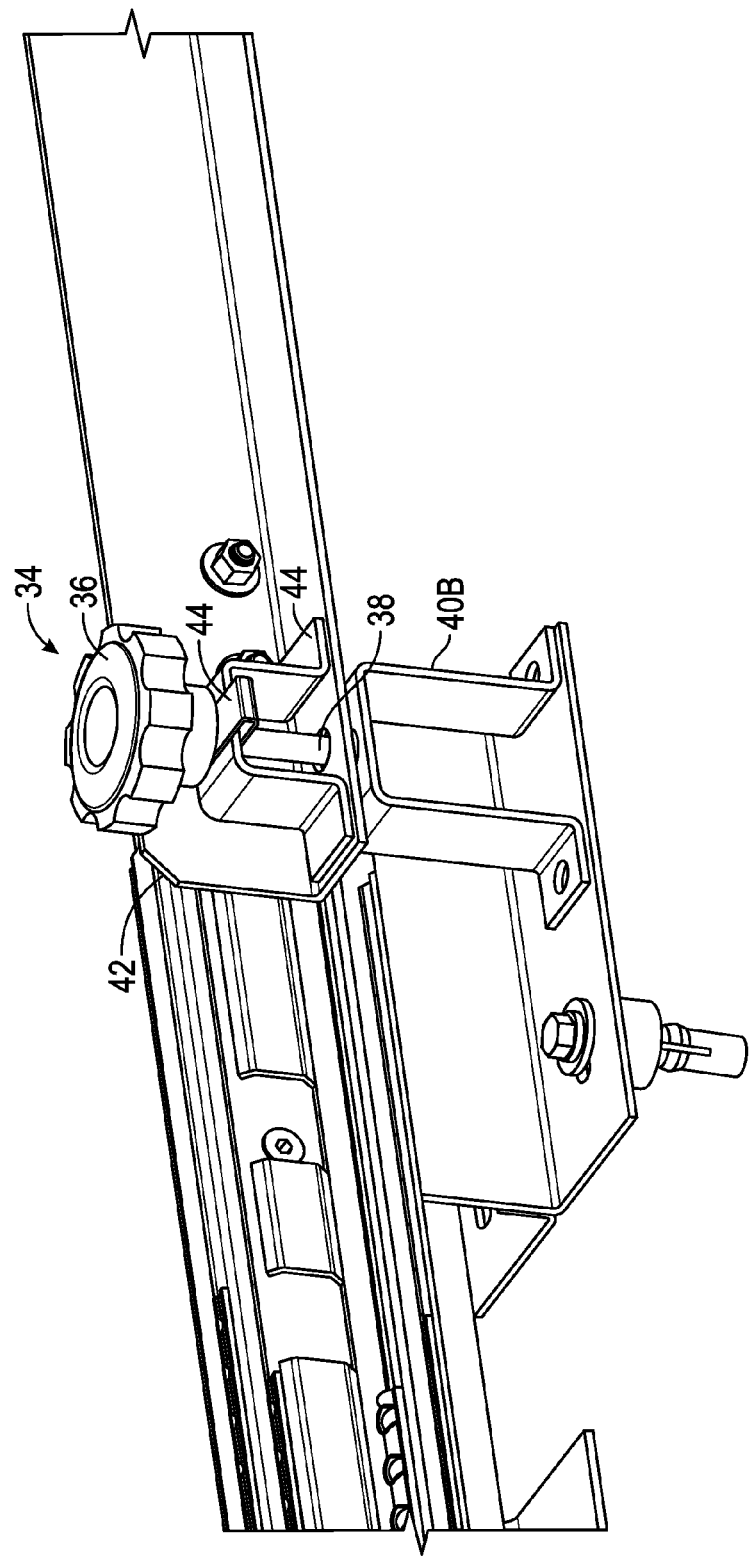
FIG. 6 is an enlarged perspective view showing details of the latch mechanism engaging a catch when the partition is in the fully extended position.

In the illustrated embodiment, positionable vehicle partition system 10 includes a latch 34 (FIGS. 4 and 5) mounted on each of brackets 30 to releasably secure or lock partition 16 in either of two different positions (i.e., the retracted position shown in FIG. 1 or the fully extended position shown in FIG. 2). However, system 10 can be designed to be locked in any number of different positions, including an infinite number of different positions (i.e., continuously variable positions).

Illustrated latch 34 includes a knob 36 that can be turned or rotated between a locked position in which pin 38 affixed to knob 36 cannot be removed from an apertured catch 40A or 40B and an unlocked position in which pin 38 can be removed from catch 40A or 40B by pulling upwardly on knob 36. Locked and unlocked positions can be provided by using a nut (not shown) retained in an opening 42 through bracket 44 by retaining clip 44, with internal threads of the nut engaging external threads of an upper portion of the pin 38.

Stops (e.g., stop 46) can be provided to limit linear movement of partition 16 between the fully retracted and the fully extended positions.

Although the present invention has been described with reference to particular means, materials and embodiments, from the foregoing descriptions, one skilled in the art can easily ascertain the essential characteristics of the present invention and various changes and modification can be made to adapt the various uses and characteristics without departing from the spirit and scope of this disclosure.

What is claimed as new and desired to be protected by Letters Patent of the United States is:

1. A positionable vehicle partition system comprising:
   at least two rails configured to be mountable on a vehicle floor or bed in a spaced apart parallel relationship;
   a substantially planar partition for separating a vehicle area into at least two sections;
   a slide assembly having a stationary slide member affixed to or defined by each of the rails, and a movable slide member extending away from and directly affixed to the partition, the movable slide member being linearly slidable with respect to the stationary slide member in a horizontally longitudinal direction, frontwardly and rearwardly relative to the vehicle floor or bed;
   a latch for retaining the partition in a selected position relative to the rails, wherein said latch is fixedly mounted to said stationary slide member with a retaining clip that locates said latch above said stationary slide member and said latch has a vertically moveable pin selectively moveable through said stationary slide member into a catch fixed above said movable slide member so that said pin engages with said catch to lock said catch but said pin does not engage said moveable slide member;
   wherein the partition comprises a panel and a structurally reinforcing frame that extends at least partially along a perimeter of the panel;
   wherein said movable slide member comprises an integral bracket angled between said slide member and said frame wherein mechanical fasteners extend through said bracket into said frame of said partition to locate said entire partition in a non-horizontal fixed position,
   wherein said frame is directly attached to said integral bracket of said moveable slide member to move with said slide member.

2. The system of claim 1, wherein the movable slide member is movable in a direction that is substantially parallel to a length direction of the rails.

3. The system of claim 1, wherein the panel is comprised of intersecting wires that define an open mesh.

4. The system of claim 1, wherein the slide assembly includes an outer slide member, an intermediate slide member that is slidably movable with respect to the outer slide member, and an inner slide member that is slidably movable with respect to the intermediate slide member.

5. The system of claim 1, wherein the slide assembly includes friction reducing bearings to facilitate sliding movement of each slide member with respect to an adjacent slide member.

* * * * *